United States Patent [19]

Ashizaki et al.

[11] Patent Number: 5,355,181
[45] Date of Patent: Oct. 11, 1994

[54] APPARATUS FOR DIRECT DISPLAY OF AN IMAGE ON THE RETINA OF THE EYE USING A SCANNING LASER

[75] Inventors: Koji Ashizaki, Tokyo; Masanobu Yamamoto; Senri Miyaoka, both of Kanagawa; Sakuya Tamada, Tokyo, all of Japan

[73] Assignee: Sony Corporation, Tokyo, Japan

[21] Appl. No.: 745,704

[22] Filed: Aug. 16, 1991

[30] Foreign Application Priority Data

Aug. 20, 1990 [JP] Japan .................. 2-216978
Mar. 14, 1991 [JP] Japan .................. 3-074736

[51] Int. Cl.$^5$ .............................. H04N 9/31
[52] U.S. Cl. .................. 348/744; 348/759; 359/201; 351/219
[58] Field of Search ........... 358/60, 63, 65, 208, 358/231, 232, 236, 241, 88, 73, 237, 235; 359/201, 213, 221; 351/219, 221, 224, 226; H04N 3/08, 3/22, 9/31, 5/74

[56] References Cited

U.S. PATENT DOCUMENTS

| | | | |
|---|---|---|---|
| 3,507,984 | 11/1966 | Stavis | 358/63 |
| 3,569,988 | 3/1971 | Schmidt et al. | |
| 3,864,730 | 2/1975 | Roth | 358/63 |
| 3,894,182 | 7/1975 | Yamamoto et al. | 358/231 |
| 4,579,430 | 4/1986 | Bille | 351/206 |
| 4,611,245 | 9/1986 | Trias | 358/235 |
| 4,833,528 | 5/1989 | Kobayashi | 358/53 |
| 4,871,247 | 10/1989 | Haynes | 351/224 |
| 4,979,030 | 12/1990 | Murata | 358/60 |
| 5,058,596 | 10/1991 | Makino et al. | 351/221 |

FOREIGN PATENT DOCUMENTS

| | | | |
|---|---|---|---|
| 0374857 | 6/1990 | European Pat. Off. | |
| 6023782 | 5/1987 | Japan | H04N 9/31 |
| 63-267073 | 11/1988 | Japan | H04N 5/74 |

Primary Examiner—James J. Groody
Assistant Examiner—Glenton B. Burgess
Attorney, Agent, or Firm—Lewis H. Eslinger; Jay H. Maioli

[57] ABSTRACT

A direct viewing picture image display apparatus displays a good picture image with a small amount of light and low power consumption using a laser beam without producing speckle noises. The display apparatus comprises a light source for emitting a laser beam, an optical modulating system for optically modulating the laser beam from the light source in response to a video signal, a scanning system for horizontally and vertically scanning the modulated laser beam from the scanning signal in response to a scanning signal, and a projecting optical system for projecting the scanned laser beam from the scanning system to form an image of the laser beam on the retina of an eye of an observer. Depth information is provided to the laser beam at a suitable stage after optical modulation by the optical modulating system so that a stereoscopic image is displayed.

20 Claims, 14 Drawing Sheets

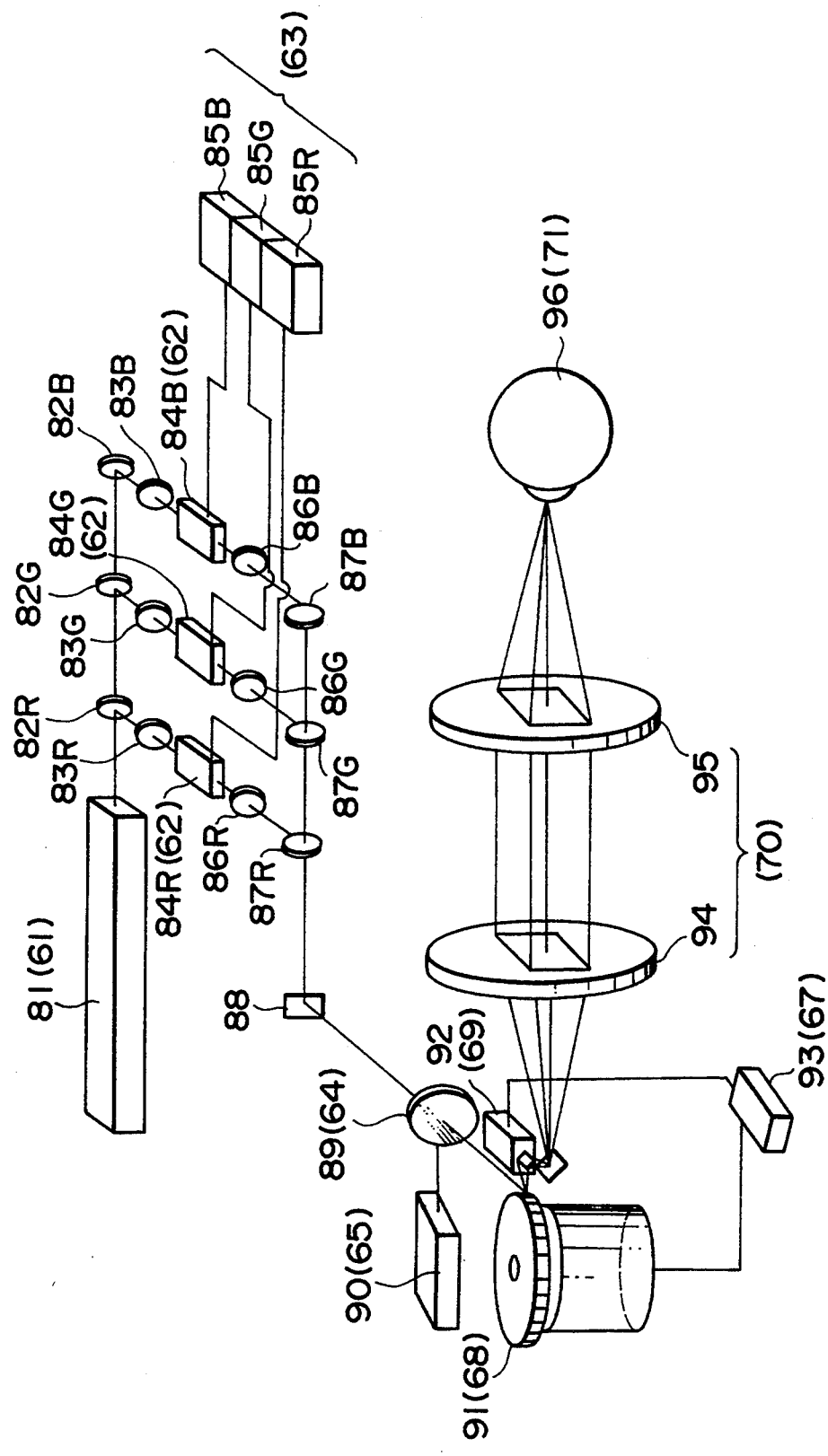

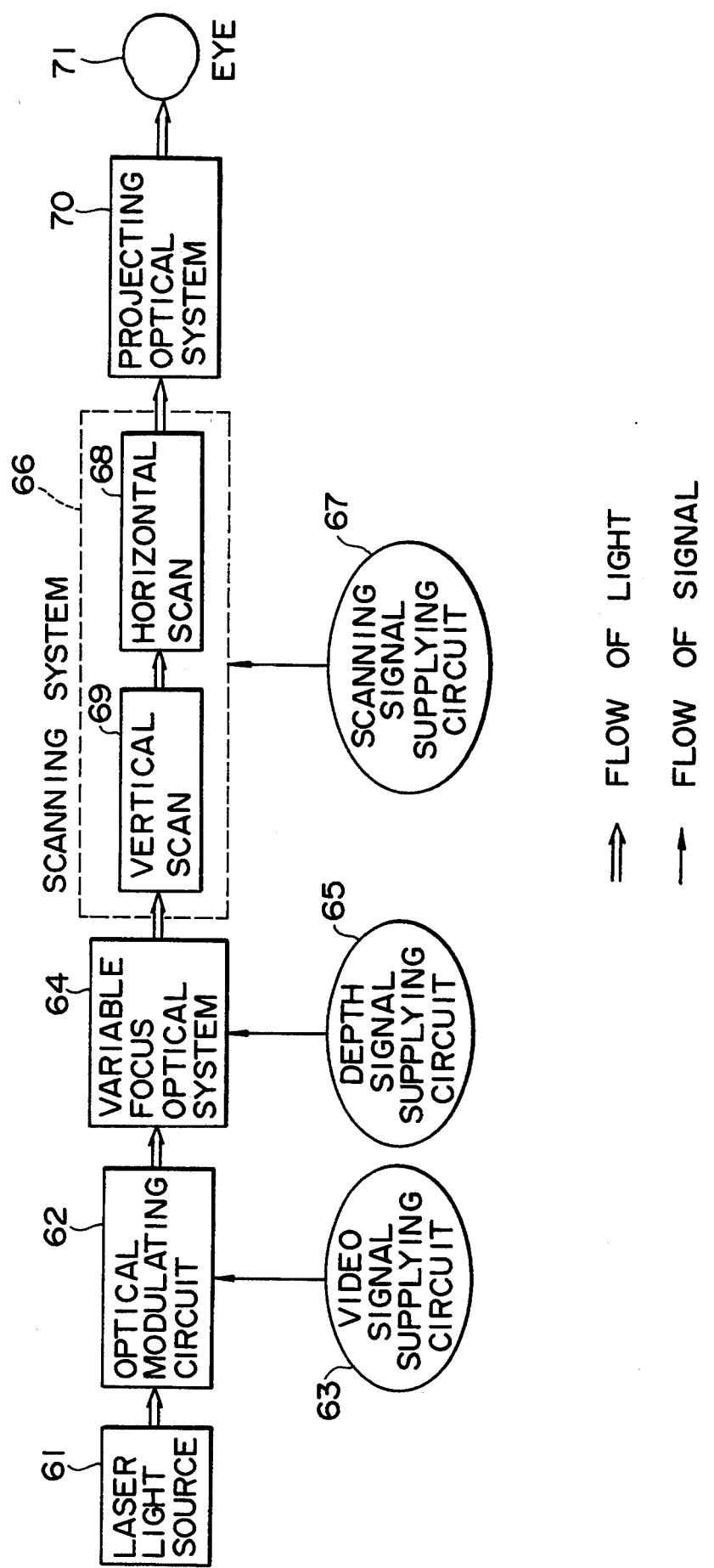

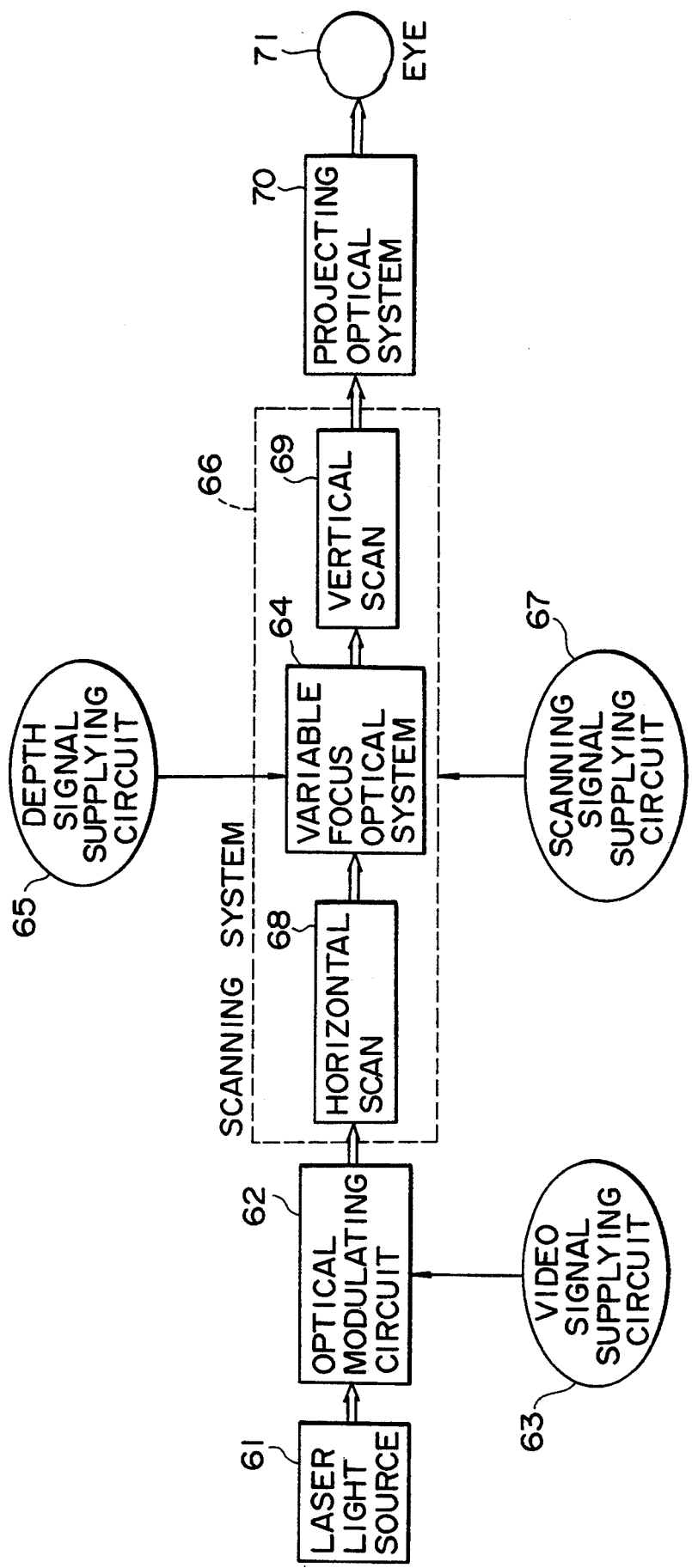

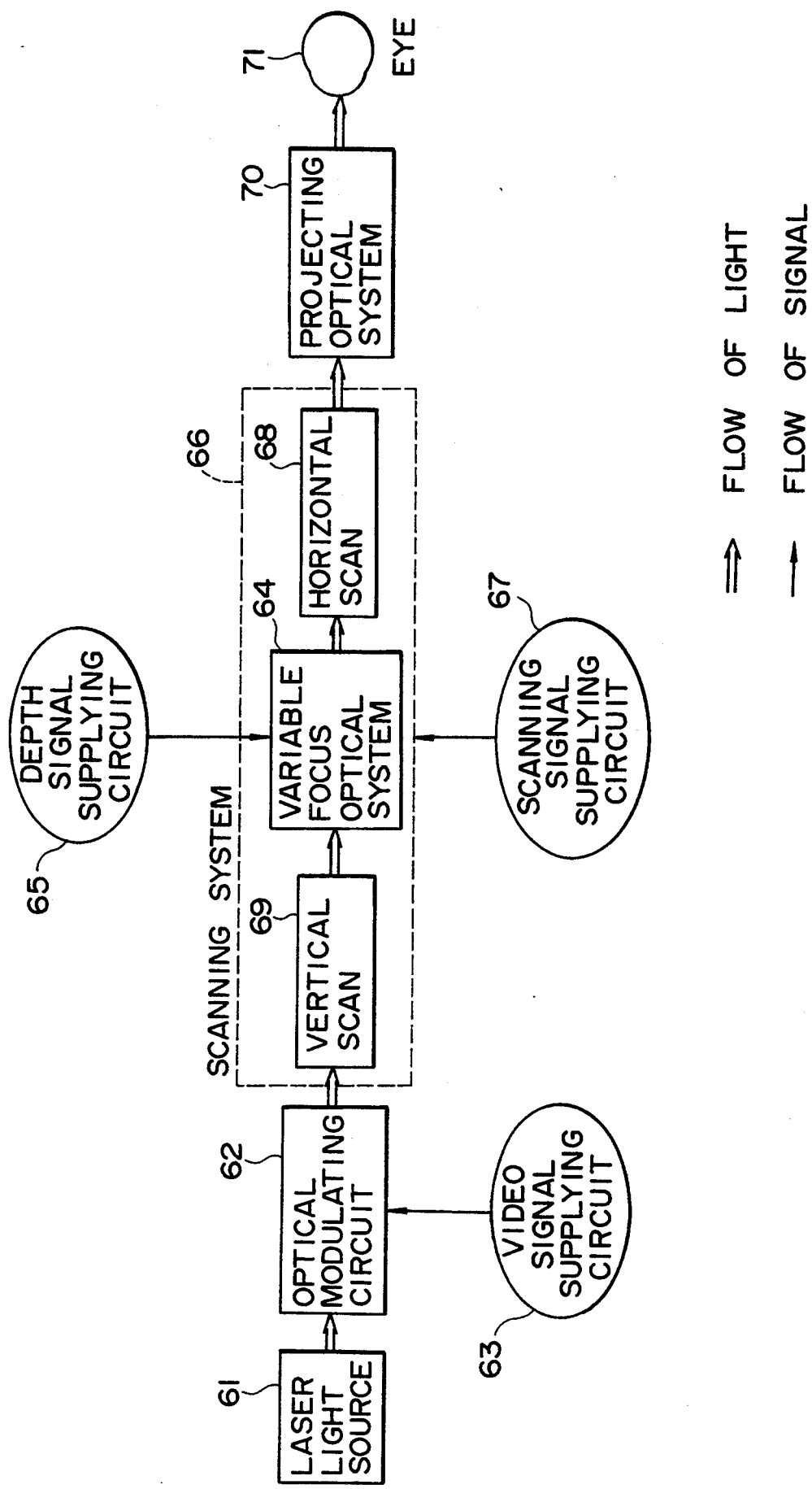

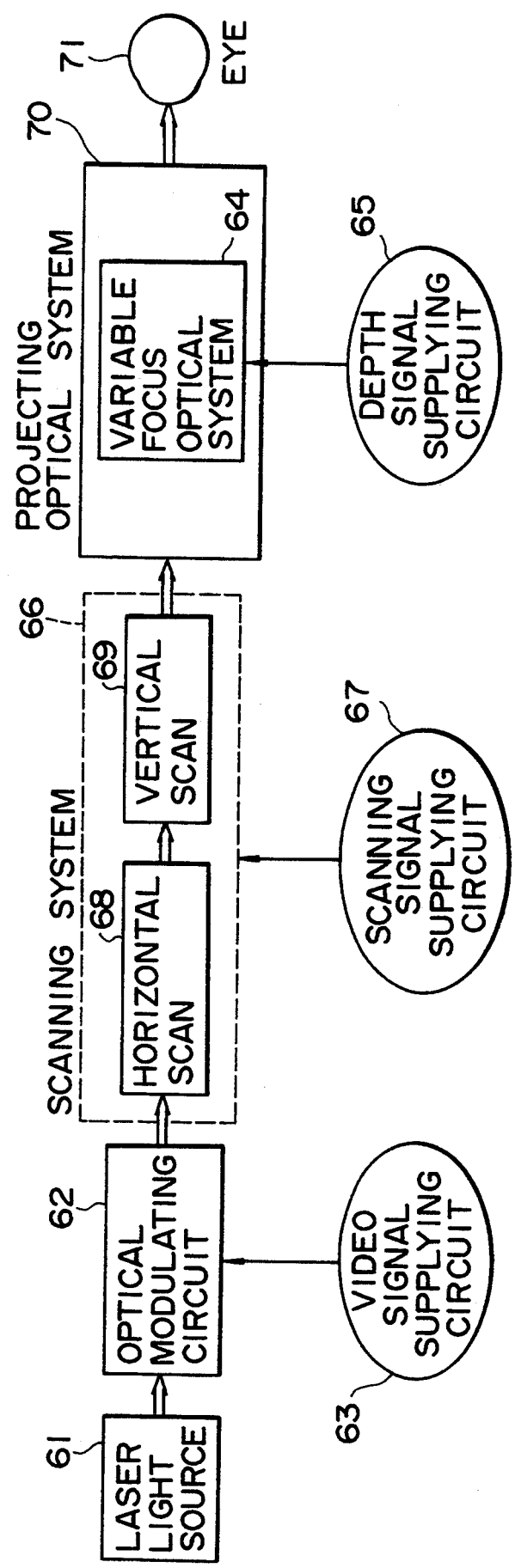

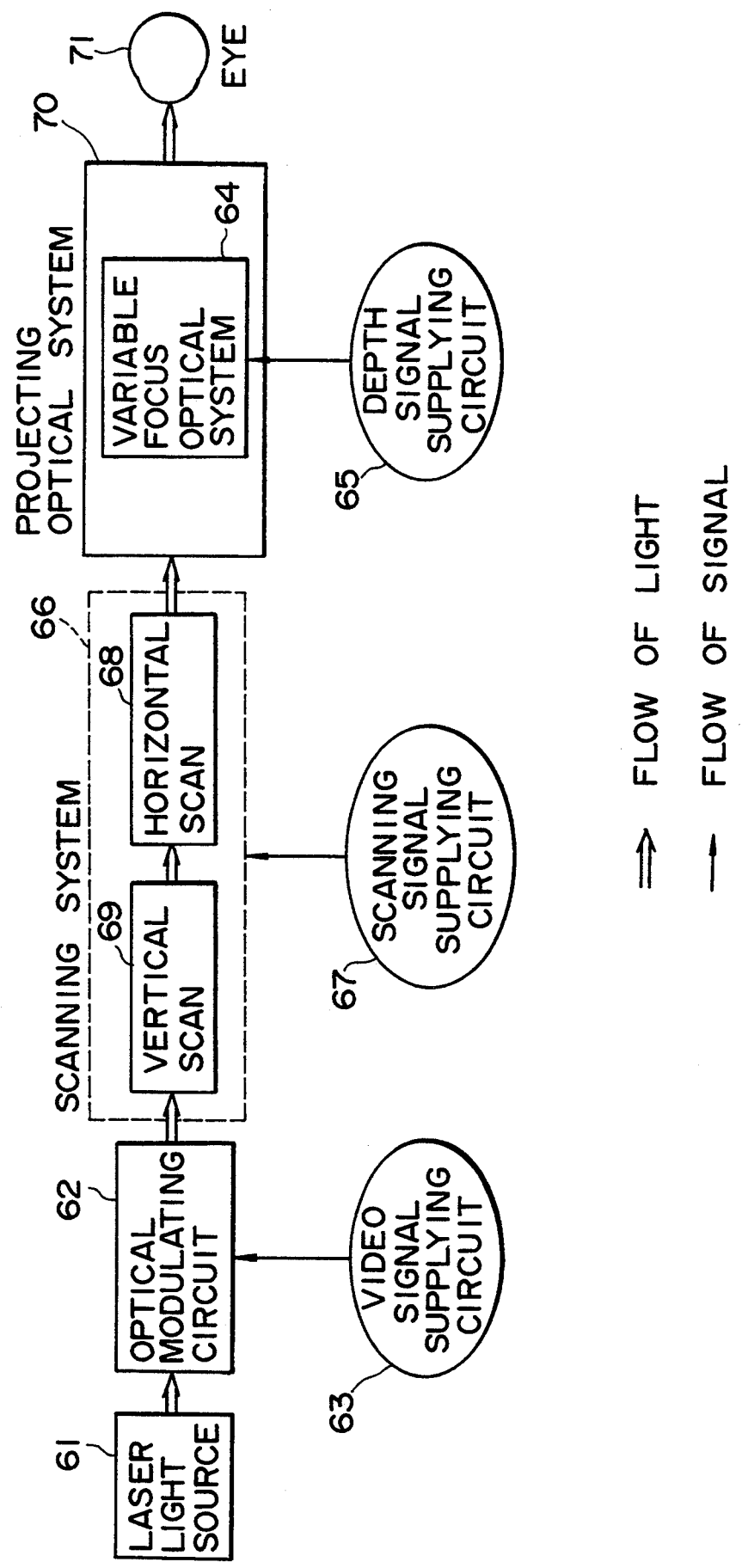

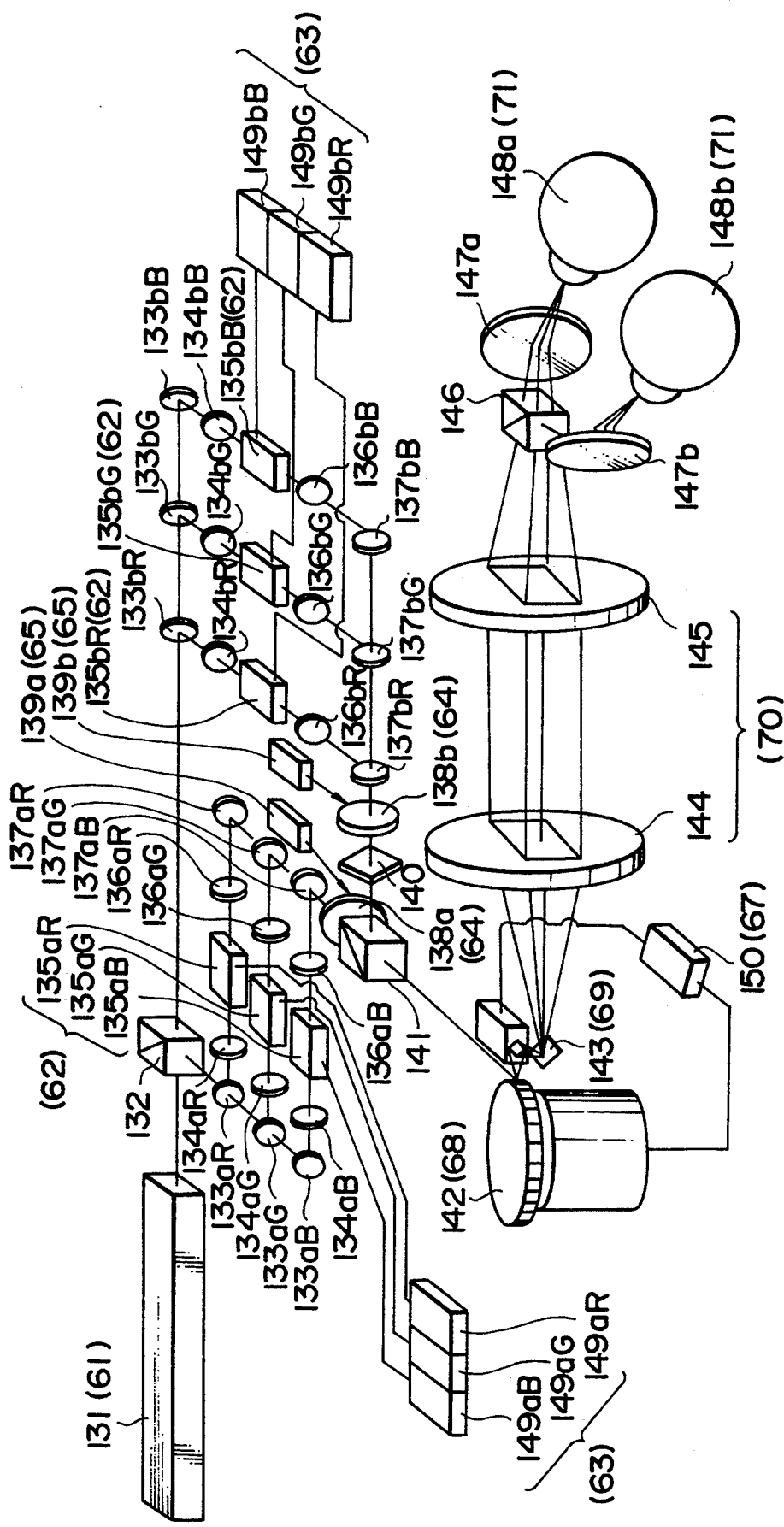

APPARATUS FOR DIRECT DISPLAY OF AN IMAGE ON THE RETINA OF THE EYE USING A SCANNING LASER

BACKGROUND OF THE INVENTION

1. Field of the Invention

This invention relates to a direct viewing picture image display apparatus for displaying a picture image on the retina of an eye using a laser beam and particularly for displaying a stereoscopic picture image using a laser beam.

2. Description of the Prior Art

Picture image display apparatus which employ a laser beam are already known. One of such picture image display apparatus is a projecting type picture image display apparatus wherein a laser beam emitted from a light source is optically modulated in response to a video signal and then horizontally and vertically scanned by a scanning system, and the thus scanned laser beam is projected to a screen. A characteristic of such apparatus is that a picture image of a high brightness, a high resolution and a high color purity can be achieved with such apparatus.

However, with the picture image display apparatus described above, since a screen has a rough surface, there is a problem that a projected laser beam is diffused, which causes flickering of the laser beam, that is, so-called speckle noises are produced.

Picture image display apparatus of the type mentioned are frequently employed to display a stereoscopic picture image thereon. Various techniques have been developed for such picture image display apparatus and disclosed in various documents including Chihiro Masuda, "Three-Dimensional Display", *Industrial Books* and "Attempt of Development of Three-Dimensional Display Till Now and Future View", *Image Information,* August, 1985. Picture images called three-dimensional picture image or stereoscopic picture image are classified into the following three types:

(1) Two-eye type picture image. From the point of view of an amount of information, such picture image has an amount of information for the left and right eyes. Such picture image is called stereoscopic picture image.

(2) A picture image as a reproduction image of a body which looks afloat at a certain location in a space. Thus, if a visual point moves, then a different side face of the picture image can be seen. Such picture image has an amount of information equal to or greater than that for a plurality of eyes. Such picture image is called three-dimensional picture image in a narrow sense.

(3) A picture image which makes use of an optical illusion.

Factors for an image to be recognized as a stereoscopic image are listed in Table 1 annexed hereto. In particular, in the case of viewing with a single eye, focusing, a magnitude of the image, a kinesthetic parallax and a field of view are such factors, and in the case of viewing with two eyes, binocular convergence and a binocular parallax are additional factors. This is disclosed, for example, in *Television Society Bulletin,* Vol. 43, NO. 8, 1989.

Factors of stereoscopic perception with conventional stereoscopic display apparatus disclosed in the documents mentioned above and so forth are classified appearing in Table 2 also annexed hereto.

Picture image display apparatus for displaying a stereoscopic picture image are also proposed in several patents including, for example, Japanese Patent Laid-Open Application No. 64-42998, Japanese Patent Laid-Open Application No. 62-77794, Japanese Patent Laid-Open Application No. 56-69612 and U.S. Pat. No. 4,799,103.

However, the display apparatus disclosed in Japanese Patent Laid-Open Application No. 64-42998 is disadvantageous in that, since a light emitting body must be caused to emit divergent light, it is difficult to achieve both a high resolution and a sufficient brightness.

Meanwhile, the display apparatus of Japanese Patent Laid-Open Application No. 62-77794 is disadvantageous in that it is difficult to realize the apparatus because a variable focus lens array of a delicate profile must be prepared.

The display apparatus disclosed in Japanese Patent Laid-Open Application No. 56-69612 is disadvantageous in that it is difficult to move a screen at a high speed and besides possible deterioration in picture quality by speckle noises cannot be avoided.

The apparatus disclosed in U.S. Pat. No. 4,799,103 is also disadvantageous in that, since it includes a variable focus mirror, a so-called phantom image phenomenon wherein the inside or the opposite side of a body being displayed can be seen takes place and it is not suitable to display an image of an image signal originating in television broadcasting or the like wherein raster scanning is performed.

Further, it is often the case with regard to any of the display apparatus described above that, since a three-dimensional image is displayed as a real image, it is complicated in construction and requires a large size.

SUMMARY OF THE INVENTION

It is an object of the present invention to provide a direct viewing picture image display apparatus wherein a good picture image can be displayed with a small amount of light and low power consumption using a laser beam without producing speckle noises.

It is another object of the present invention to provide a direct viewing picture image display apparatus of a small size and a simple construction which can display a stereoscopic image thereon.

In order to attain the objects, according to one aspect of the present invention, there is provided a direct viewing picture image display apparatus which comprises a light source for emitting a laser beam, video signal supplying means for supplying a video signal, modulating means for optically modulating the laser beam emitted from the light source in response to the video signal supplied from the video signal supplying means, scanning signal supplying means for supplying a scanning signal, scanning means for horizontally and vertically scanning the modulated laser beam from the scanning signal in response to the scanning signal supplied from the scanning signal supplying means, and a projecting optical system for projecting the scanned laser beam received from the scanning means to form an image of the laser beam on the retina of an eye of an observer of the direct viewing picture image display apparatus.

With the direct viewing picture image display apparatus, a laser beam emitted from the light source is modulated, for example, in intensity, in response to a video signal by the modulating means and then horizontally and vertically scanned by the scanning means. The thus scanned laser beam is focused on the retina of an eye by the projecting optical system to form an image of the laser beam so that it can be visually observed directly as a picture image by an observer of the direct viewing picture image display apparatus.

Since the picture image is formed with a laser beam, the color purity is high and a high resolution can be obtained. Further, since all light is directed toward an eye, a high brightness can be obtained with a small amount of light. Besides, production of speckle noises, which are observed on a projecting picture image display apparatus which employs a laser beam, can be prevented, and accordingly, a good picture image can be observed with low power consumption.

According to another aspect of the present invention, there is provided a direct viewing picture image display apparatus which comprises a light source for emitting a laser beam, video signal supplying means for supplying a video signal, modulating means for optically modulating the laser beam emitted from the light source in response to the video signal supplied from the video signal supplying means, depth signal supplying means for supplying depth information, a variable focus optical system for providing the depth information supplied from the depth signal supplying means to the modulated laser beam received from the modulating means, scanning signal supplying means for supplying a scanning signal, scanning means for scanning the laser beam received from the variable focus optical system in response to the scanning signal supplied from the scanning signal supplying means, and a projecting optical system for projecting the scanned laser beam received from the scanning means to form an image of the laser beam on the retina of an eye of an observer of the direct viewing picture image display apparatus.

The variable focus optical system may otherwise be included in or integrated with the scanning means or the projecting optical system.

With the direct viewing picture image display apparatus, depth information is provided by the variable focus optical system to a laser beam at a suitable stage after optical modulation by the optical modulating means, and the laser beam after scanning in response to a scanning signal by the scanning means is focused to form an image on the retina of an eye. Accordingly, the direct viewing picture image display apparatus can display a stereoscopic picture image thereon without production of a phantom image comparing with any other display system of the depth sampling type and can be produced in a small size with a simple construction. Further, since the magnitude of a stereoscopic picture image to be formed depends only upon an angle of visibility up to a stage preceding the projecting optical system, even when a large stereoscopic picture image is to be displayed, the apparatus need not be increased in size. Besides, the direct viewing picture image display apparatus can be applied regardless of the current television systems of NTSC, PAL, SECAM and HDTV, and stereoscopic display of a television signal is possible if a variable focus optical system employee can be driven at a high speed.

In accordance with a further aspect of the present invention, there is provided a direct viewing picture image display apparatus which comprises a light source for emitting a linearly polarized laser beam, means for dividing the laser beam from the light source into first and second laser beams, first and second video signal supplying means for supplying first and second video signals, respectively, first and second modulating means for optically modulating the first and second laser beams from the dividing means in response to the first and second video signals supplied from the first and second video signal supplying means, respectively, first and second depth signal supplying means for supplying first and second depth information, first and second variable focus optical systems for providing the first and second depth information supplied from the first and second depth signal supplying means to the modulated laser beams received from the first and second modulating means, respectively, means for rotating the laser beam from the second variable focus optical system to produce a laser beam having a polarization plane perpendicular to that of the output laser beam of the first variable focus optical system, means for combining the laser beams from the first variable focus optical system and the rotating means into a single laser beam, scanning signal supplying means for supplying a scanning signal, scanning means for scanning the laser beam received from the combining means in response to the scanning signal supplied from the scanning signal supplying means, and a projecting optical system for dividing the scanned laser beam received from the scanning means into two beams having perpendicular polarization planes relative to each other and projecting the two beams to form images of the beams on the retinae of a pair of eyes of an observer of the direct viewing picture image display apparatus.

With the direct viewing picture image display apparatus, an observer can observe a stereoscopic image with naked of eyes.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 6 is a similar view but showing a third preferred embodiment of the present invention;

FIG. 7b is a similar view but showing a modification to the direct viewing picture image display apparatus of FIG. 7a;

FIG. 8a is a similar view but showing another modification to the direct viewing picture image display apparatus of FIG. 7a;

FIG. 8b is a similar view but showing a modification to the modified direction viewing picture image display apparatus of FIG. 8a;

FIG. 9a is a similar view but showing a further modification to the direct viewing picture image display apparatus of FIG. 7a;

FIG. 9b is a similar view but showing a modification to the modified direction viewing picture image display apparatus of FIG. 9a;

FIG. 12 is a diagrammatic view of a still further viewing picture image display apparatus showing a fourth preferred embodiment of the present invention.

DETAILED DESCRIPTION OF THE PREFERRED EMBODIMENTS

Figure 1:
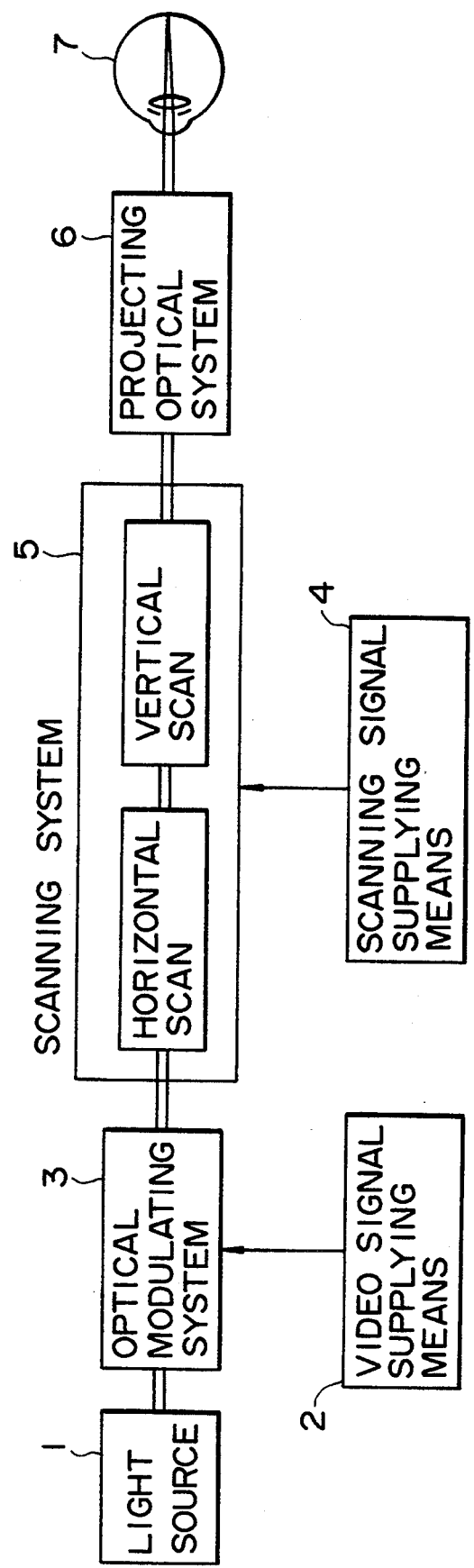
FIG. 1 is a block diagram of a direct viewing picture image display apparatus showing a preferred embodiment of the present invention.

Referring first to FIG. 1, there is shown general construction of a direct viewing picture image display apparatus to which the present invention is applied. The picture image display apparatus shown includes a light source 1 which may be any of a semiconductor laser, a He-Ne laser or the like. An optical modulating system 3 serving as modulating means receives a laser beam emitted from the light source 1 and intensity modulates the received laser beam in response to a video signal supplied from a video signal supplying circuit 2. A scanning system 5 serving as scanning means receives the thus intensity modulated laser beam from the optical modulating system 3 and horizontally and vertically scans the thus received laser beam in response to a scanning signal supplied from scanning signal supplying means 4. A projecting optical system 6 receives the thus scanned laser beam from the scanning system 5 and focuses the laser beam to form an image directly on the retina of an eye 7. It is to be noted that, where a semiconductor laser is employed for the light source, the optical modulating system 3 can be integrated with the light source 1.

Figure 2:
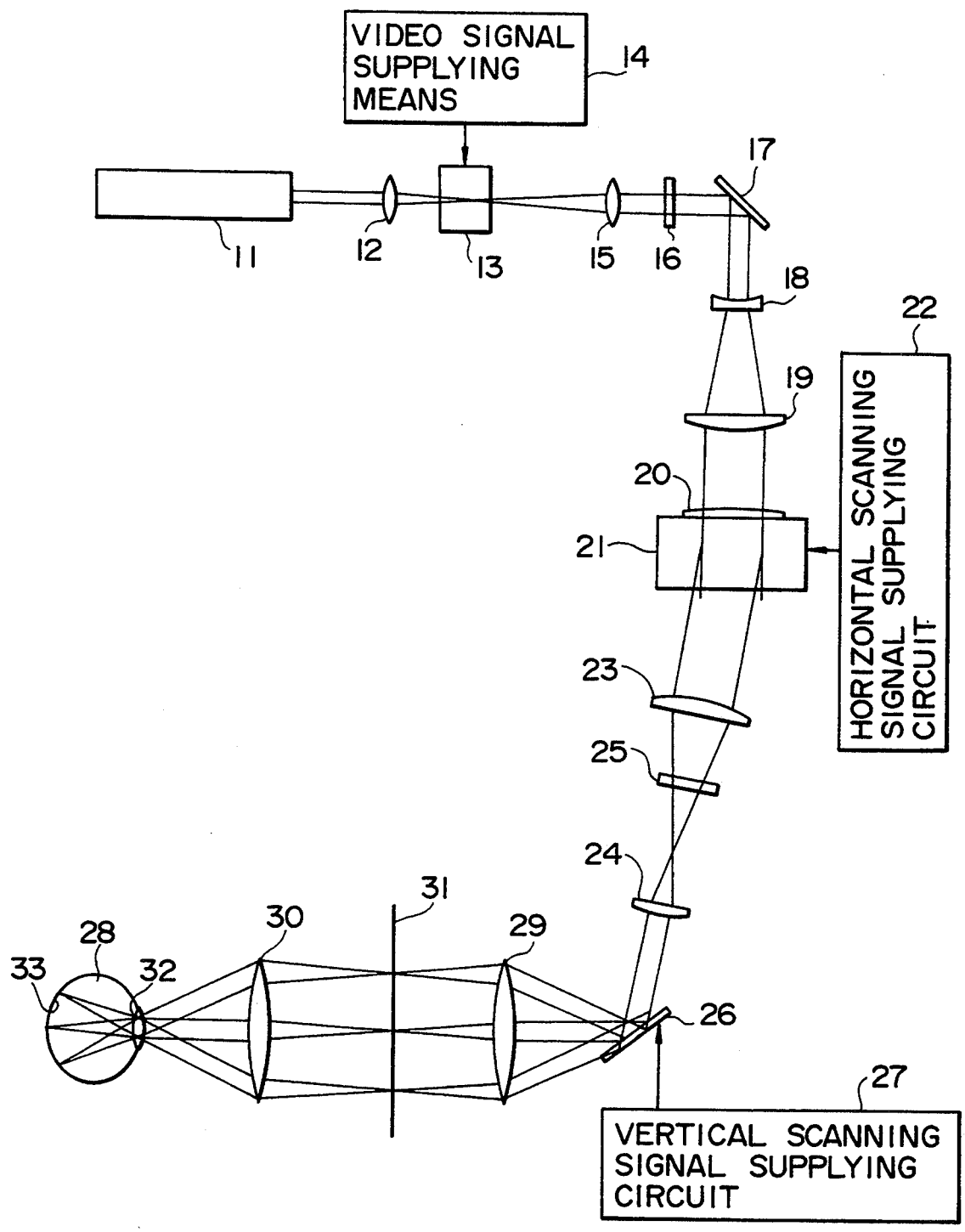
FIG. 2 is a diagrammatic representation showing detailed construction of the direct viewing picture image display apparatus of FIG. 1.

More detailed construction of the direct viewing picture image display apparatus is illustrated in FIG. 2. Referring to FIG. 2, a He-Ne laser 11 is employed as the light source 1. A laser beam emitted from the He-Ne laser 11 is converged by a convex lens 12 and introduced into an audio optical modulator (AOM) 13 which serves as the optical modulating system 3. The incident laser beam is intensity modulated by the audio optical modulators 13 in response to a video signal received from a video signal supplying circuit 14 which serves as the video signal supplying means 2. The thus modulated laser beam is changed into a parallel beam by a convex lens 15, passes through a filter (ND-F) 16 and comes to a reflecting mirror 17, at which the laser beam is deflected substantially at a right angle. Here, the filter 16 may be a black filter and attenuates the intensity of the incident laser beam to such a level at which the laser beam will not be harmful to an eye into which it is introduced.

The laser beam reflected by the reflecting mirror 17 is converted by a set of cylindrical lenses 18, 19 and 20 into a beam which has an elliptical transverse section suitable for the beam to be subsequently introduced into an audio optical deflector (AOD) 21 which serves as a horizontal scanning system. The incident laser beam to the audio optical deflector 21 is then horizontally scanned in accordance with a horizontal scanning signal received from a horizontal scanning signal supplying circuit 22 which serves as the scanning signal supplying means 4. The thus horizontally scanned laser beam is returned into a beam of a circular transverse section by a pair of cylindrical lenses 23 and 24. A λ/4 polarizing plate 25 is interposed between the cylindrical lenses 23 and 24 and converts the laser beam having a vertical polarization plane into circularly polarized light. The laser beam having a circular transverse section after conversion into circularly polarized light is then introduced into a galvanometric mirror (GM) 26 which serves as the vertical scanning system. The galvanometric mirror 26 is driven in response to a vertical scanning signal received from a vertical scanning signal supplying circuit 27 which serves as the scanning signal supplying means so that the laser beam is vertically scanned.

The laser beam modulated and scanned in such a manner as described above is introduced into an eye 28 (corresponding to the eye 7 shown in FIG. 1) by way of a pair of lenses 29 and 30 which constitute the projecting optical system 6 for projecting light to the eye 28. In particular, the laser beam from the galvanometric mirror 26 is converged once on a plane 31 by the lens 29 and then converted into a parallel beam by the lens 30 and introduced into the eye 28. Consequently, an image of the laser beam is formed on the retina 33 by the crystal lens 32 of the eye 29.

Figure 3:
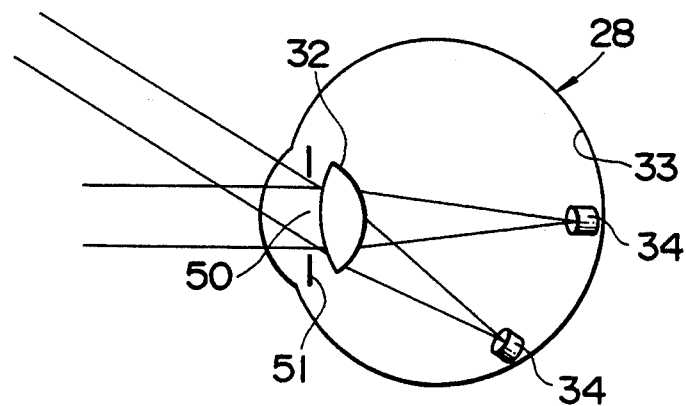
FIGS. 3 and 4 are diagrammatic views showing paths of light in an eyeball.
Figure 4:
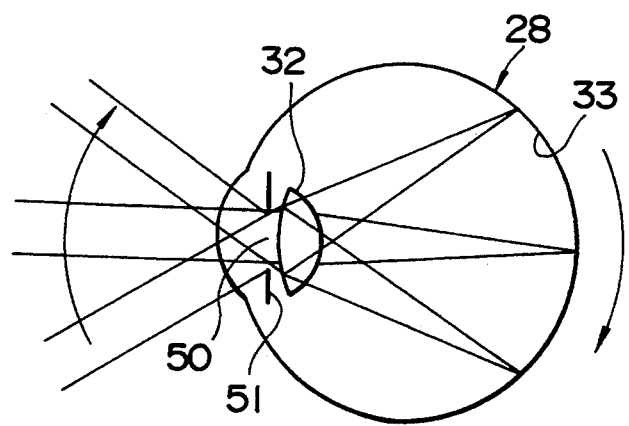

The eye 28 operates so that rays of light emitted from a point in a space of an external field are focused to form an image on the retina 33 by the crystal lens 32 to stimulate visual cells 34 on the retina 33 as seen in FIG. 3 so that a picture image is perceived as an aggregate of image points. With the direct viewing picture image display apparatus, a laser beam is scanned on the retina 33 as seen in FIG. 4 to cause a picture image to be perceived.

With a picture image display apparatus constructed in accordance with the present embodiment, the amount of light admitted into the eye 28 ranged from 1 nw to 2 nw, and a resolution of 300 to 350 lines was achieved. Further, while the diameter of a spot of a laser beam at the location of the pupil was about 2.2 mm, such diameter is preferably greater than 1 mm because sight of a picture image will be lost as a result of movement of the pupil 50 or the iris 51 if the spot diameter will be smaller than 1 mm. Further, the horizontal angle of visibility was 8,8 degrees. Such angle of visibility corresponds to that of a case wherein a television receiver of the 1.9 inch size is viewed from a location spaced by 25 cm. A greater angle of visibility is preferable because this corresponds to a case wherein a screen of a greater size is watched.

According to the present embodiment, since no screen is employed, speckle noises which are often observed on a projecting picture image display apparatus can be removed. Besides, since all of a laser beam is directed toward an eye, only a small amount of light is required, and the power to be consumed by the He-Ne laser 11 which emits a laser beam can be reduced. Further, a picture image has a characteristic that it can be seen only by an observer and not seen from the circumference.

Figure 5:
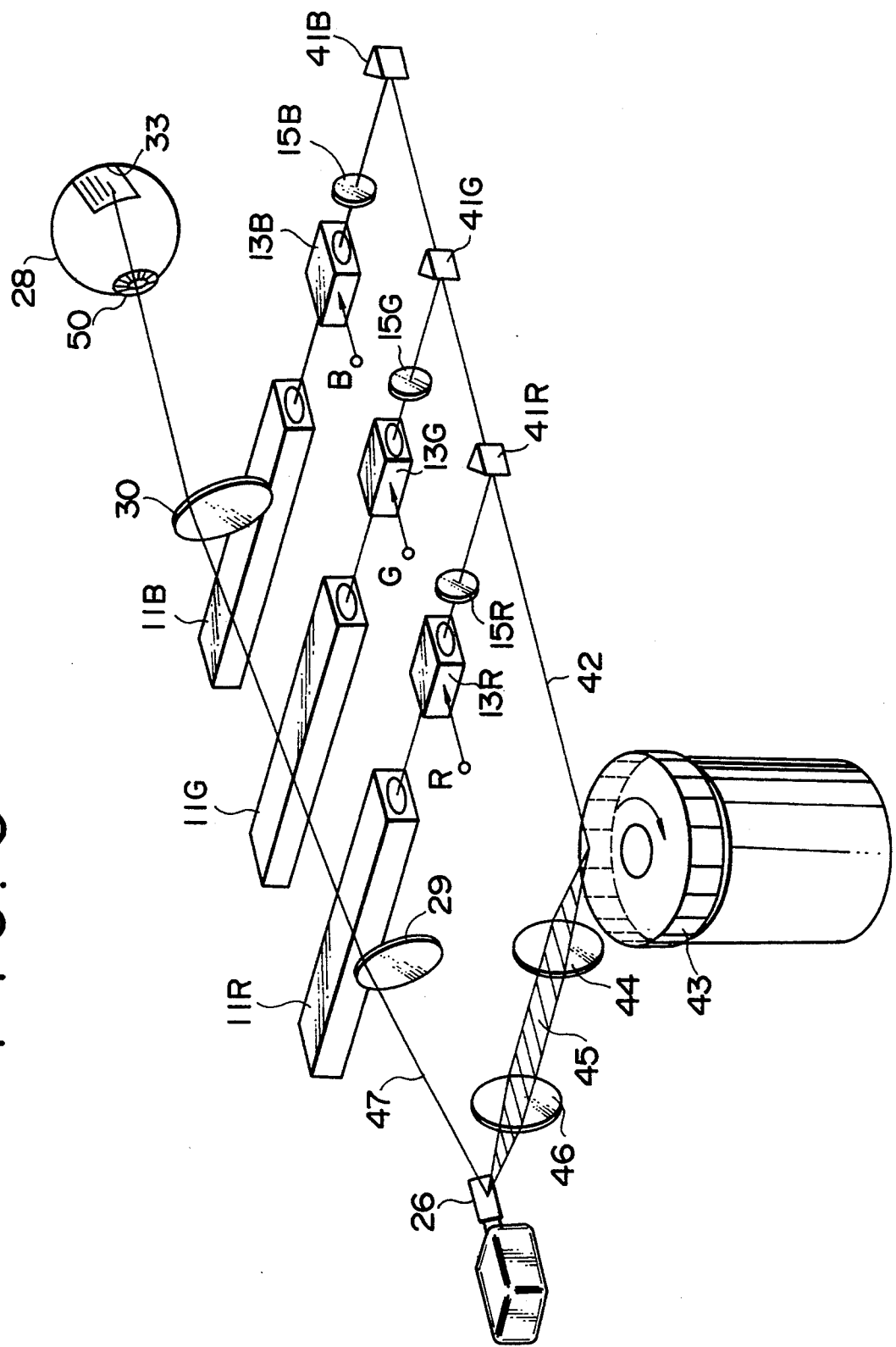
FIG. 5 is a diagrammatic view of another direct viewing picture image display apparatus showing a second preferred embodiment of the present invention.

Referring now to FIG. 5, there is shown a color picture image display apparatus which is an exemplary application of the picture image display apparatus shown in FIG. 2. The color picture image display apparatus includes three lasers 11R, 11G and 11B serving as light sources for emitting laser beams of three colors of red, green and blue, respectively. Three audio optical modulators 13R, 13G and 13B and three dichroic mirrors 41R, 41G and 41B are provided on paths of laser beams emitted from the lasers 11R, 11G and 11B, respectively. Thus, laser beams emitted from the lasers 11R, 11G and 11B are optically modulated in response to color signals of red, green and blue by the audio optical modulators 13R, 13G and 13B, respectively, and the thus modulated laser beams are combined into a single laser beam 42 by the dichroic mirrors 41R, 41G and 41B which reflect light of the respective colors but pass light of the other colors. Then, the single laser beam 42 is horizontally scanned by a rotary polygon mirror 43 which serves as the horizontal scanning system.

The thus horizontally scanned laser beam is subsequently converted into a parallel beam 45 by a lens 44 and then condensed by another lens 46 and introduced to a galvanometric mirror 26 which serves as the vertical scanning system. Consequently, the laser beam is vertically scanned by the galvanometric mirror 26.

The laser beam 47 of the three colors modulated and scanned in this manner is then introduced into an eye 28 by way of a pair of lenses 29 and 30 which serve as a projecting optical system for projecting light to the eye 28.

With the direct viewing picture image display apparatus of the present embodiment, a color picture image can be displayed using the lasers 11R, 11G and 11B of a plurality, three in this instance, of different wavelengths. Such plurality of wavelengths need not be three but may be four or more. The color reproduction range increases as the number of such wavelengths increases.

Figure 7A:
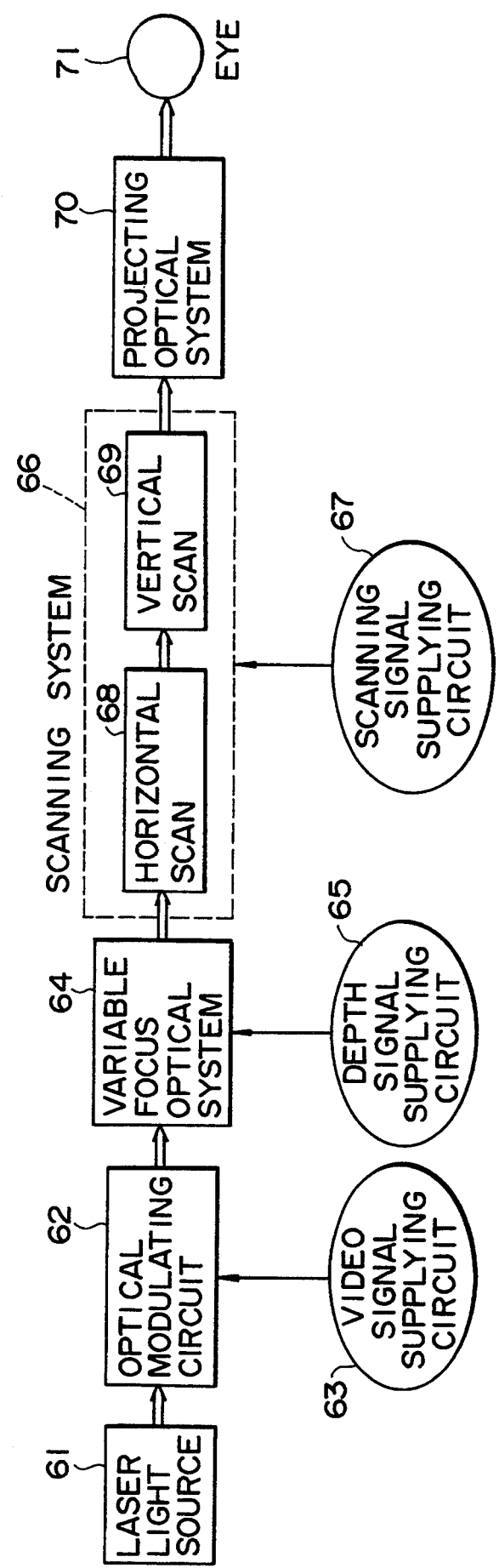
FIG. 7a is a block diagram showing general construction of the direct viewing picture image display apparatus of FIG. 6.

Referring now to FIG. 7a, there is shown general construction of a further direct viewing picture image display apparatus to which the present invention is applied. The direct viewing picture image display apparatus shown includes a laser light source 61 for emitting a laser beam, an optical modulating circuit 62 for optically modulating a laser beam received from the laser light source 61 in response to a video signal supplied from a video signal supplying circuit 63, a variable focus optical system 64 for focusing a laser beam received from the optical modulating circuit 62 with a variable focus which varies in response to a depth signal supplied from a depth signal supplying circuit 65, a scanning circuit 66 including a horizontal scanning circuit 68 for scanning a laser beam received from the variable focus optical system 64 in a horizontal direction in response to a scanning signal supplied from a scanning signal supplying circuit 67 and a vertical scanning circuit 69 for scanning the horizontally scanned laser beam in a vertical direction, and a projecting optical system 70 for projecting a laser beam received from the scanning circuit 66 to an eye 71.

In the direct viewing picture image display apparatus shown in FIG. 7a, the scanning circuit 66 is constituted so that a laser beam received from the variable focus optical system 64 is first scanned in a horizontal direction by the horizontal scanning circuit 68 and then scanned in a vertical direction by the vertical scanning circuit 69. However, the scanning circuit 66 may be modified in such a manner as seen in FIG. 7b wherein a laser beam received from the variable focus optical system 64 is first scanned in a vertical direction by the vertical scanning circuit 69 and then scanned in a horizontal direction by the horizontal scanning circuit 68.

While the variable focus optical system 64 is interposed between the optical modulating circuit 62 and the scanning circuit 66 in the direct viewing picture image display apparatus, otherwise it is possible, for example, to interpose the variable focus optical system 64 in the scanning circuit 66 as shown in FIG. 8a or 8b. In the modified optical modulating circuit 64 of the arrangement shown in FIG. 8a, an optical modulated laser beam from the optical modulating circuit 62 is first received and horizontally scanned by the horizontal scanning circuit 68 and then inputted to the vertical scanning circuit 69 by way of the variable focus optical system 64. On the other hand, in the modified optical modulating circuit 64 of the arrangement shown in FIG. 8b, a laser beam from the optical modulating circuit 62 is first scanned in a vertical direction by the vertical scanning circuit 69 and then inputted to the horizontal scanning circuit 68 by way of the variable focus optical system 64.

Or else, it is possible to interpose the variable optical system 64 in the projecting optical system 70 as seen in FIG. 9a or 9b. In this instance, the horizontal scanning circuit 68 and the vertical scanning circuit 69 may be arranged in this order in the scanning circuit 66 as seen in FIG. 9a or in the reverse order as seen in FIG. 9b.

While the variable focus optical system 64 can be interposed at such various positions as described above and shown in FIGS. 7a to 9b in the other components of the direct viewing picture image display apparatus, such interposition thereof between the optical modulating circuit 62 and the scanning circuit 66 as shown in FIG. 7a or 7b is advantageous in that the diameter of a lens which is a component of the variable focus optical system 64 can be reduced and the magnitude of an image formed does not vary when the focal length varies.

Referring now to FIG. 6, there is shown detailed construction of the direct viewing picture image display apparatus described hereinabove with reference to FIG. 7a. In the direct viewing picture image display apparatus, the laser light source 61 of the block diagram of FIG. 7a is constituted from an RGB laser 81. The optical modulating circuit 62 is constituted from three audio optical modulators (AOMs) 84R, 84G and 84B while video signal supplying circuits 85R, 85G and 85B correspond to the video signal supplying circuit 63. The variable focus optical system 64 is constituted from a variable focus lens 89 while a depth signal supplying circuit 90 corresponds to the depth signal supplying circuit 65, and the horizontal scanning circuit 68 is constituted from a polygonal mirror 91. The vertical scanning circuit 69 is constituted from a galvanometric mirror 92. A scanning signal supplying circuit 93 corresponds to the scanning signal supplying circuit 67. Further, the projecting optical system 70 is constituted from a pair of relay lenses 94 and 95 while an eye 96 corresponds to the eye 71.

In operation, a laser beam having three wavelengths of red (R), green (G) and blue (B) is emitted from the RGB laser 81. A dichroic mirror 82R reflects the wavelength component of red of the laser beam received from the RGB laser 81 while it passes the components of green and blue therethrough. Meanwhile, a dichroic mirror 82G reflects the component of green of the incidence laser beam received from the RGB laser 81 by way of the dichroic mirror 82R and passes the component of blue therethrough. A mirror 82B reflects the laser beam received by way of the dichroic mirror 82G and having only the component of blue. The laser beams of the wavelengths of R, G and B reflected by the dichroic mirrors 82R and 82G and mirror 82B are subsequently shaped into beams of a shape suitable for subsequent modulation by the audio optical modulators 84R. 84G and 84B by lenses 83R, 83G and 83B, respectively. The thus shaped laser beams are then inputted to the corresponding audio optical modulators 84R, 84G and 84B to which video signals of red, green and blue are supplied from the video signal supplying circuits 85R, 85G and 85B, respectively. Thus, the audio optical modulators 84R, 84G and 84B optically modulate the individual incident laser beams in response to the video signals supplied thereto.

The laser beams outputted from the audio optical modulators 84R, 84G and 84B are subsequently arranged in beam shape by lenses 86R, 86G and 86B, respectively, and then introduced into dichroic mirrors 87R, 87G and 87R, at which they are reflected, respectively. The laser beam of the blue component reflected by the mirror 87B is then introduced into and passes through the dichroic mirror 87G so that it is combined with the laser beam of the green component introduced to the dichroic mirror 87G from the lens 86G. The laser beam including the blue and green components is then introduced into the dichroic mirror 87R at which it is combined with the laser beam of the red component supplied from the lens 86R thereby to form a single laser beam. The laser beam thus formed is subsequently reflected by a mirror 88 and then introduced into the variable focus lens 89. The focal length of the variable focus lens 89 varies in response to a depth signal supplied from the depth signal supplying circuit 90.

The laser beam outputted from the variable focus lens 89 is introduced to the polygonal mirror 91 and scanned in a horizontal direction by the polygonal mirror 91 in response to a horizontal scanning signal supplied from the scanning signal supplying circuit 93. The laser beam reflected by the polygonal mirror 91 is then introduced to the galvanometric mirror 92 and scanned in a vertical direction by the galvanometric mirror 92 in response to a vertical scanning signal received from the scanning signal supplying circuit 93. The laser beam scanned in the horizontal and vertical directions in this manner is then introduced into the eye 96 by way of the relay lenses 94 and 95.

Figure 10A:
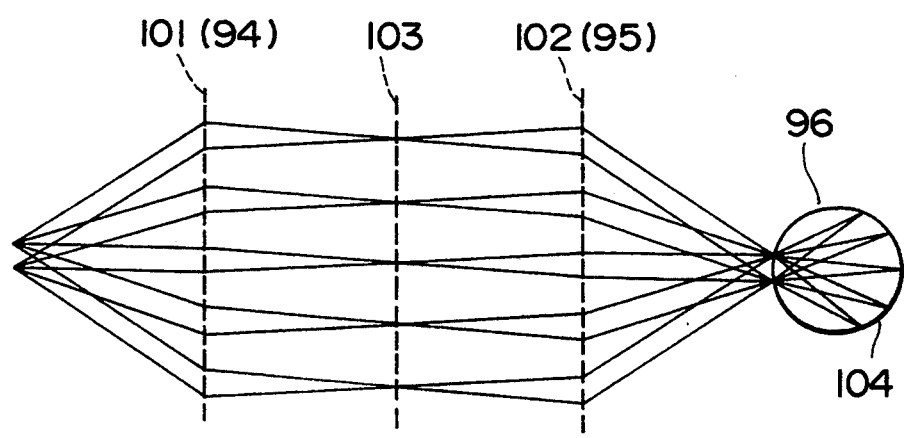
FIGS. 10a and 10b are diagrammatic representations illustrating operation of the direct viewing picture image display apparatus of FIG. 6.
Figure 10B:
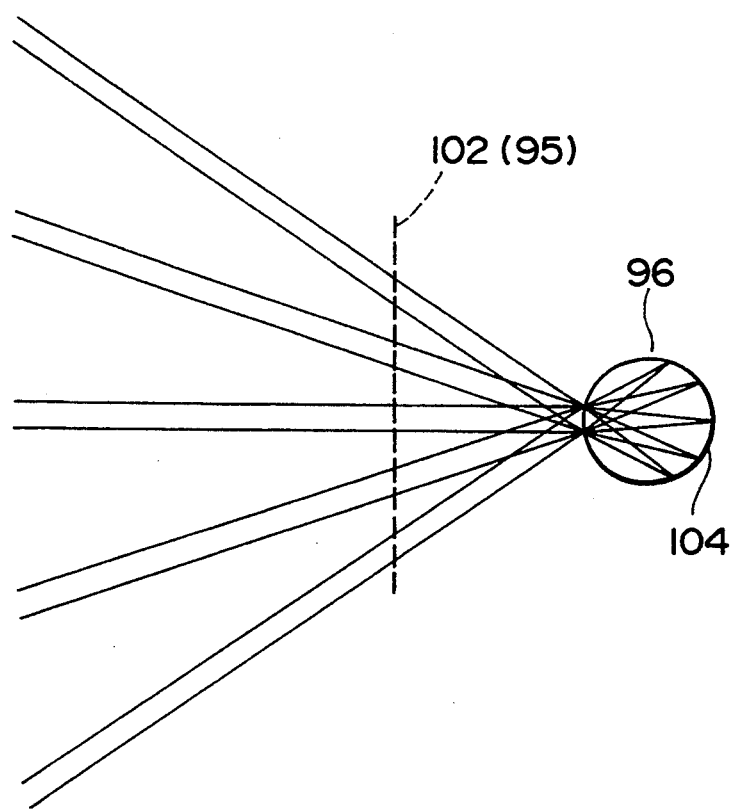

Subsequently, a principle of operation of FIG. 6 will be described with reference to FIGS. 10a, 10b and 11a, 11b. For the convenience of description, it is assumed here that the projecting optical system 70 including the relay lenses 94 and 95 is constructed as an infinite focus optical system including a pair of ideal lenses 101 and 102 which commonly have a focal plane 103 as shown in FIG. 10a. Now, if it is assumed that the variable focus lens 89 is not interposed, then a real image will be formed on the focal plane 103, and such real image is projected to the fundus 104 of the eye 96. Accordingly, a laser beam being scanned is all focused to form an image on the fundus 104 as seen in FIG. 10b, and the eye 96 sees a virtual image at an infinite remote distance.

Figure 11A:
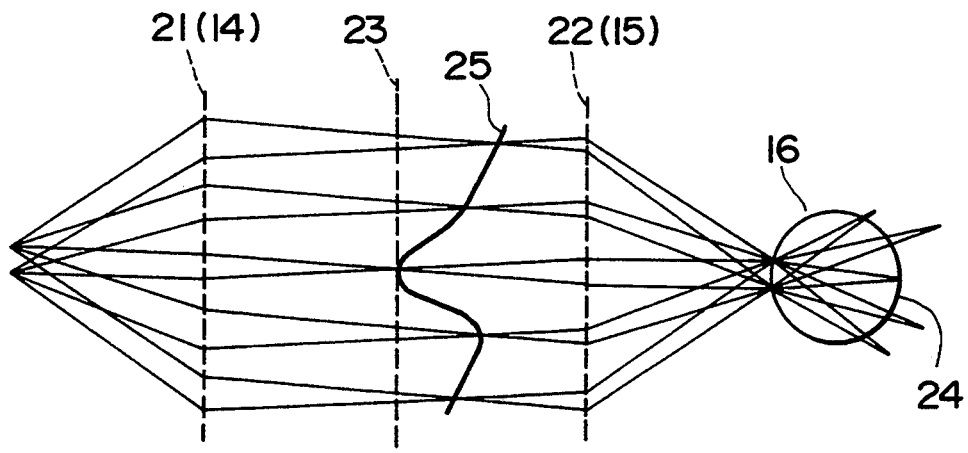
FIGS. 11a and 11b are views similar to FIGS. 10a and 10b, respectively, but illustrating a different manner of operation of the direct viewing picture image display apparatus of FIG. 6.
Figure 11B:
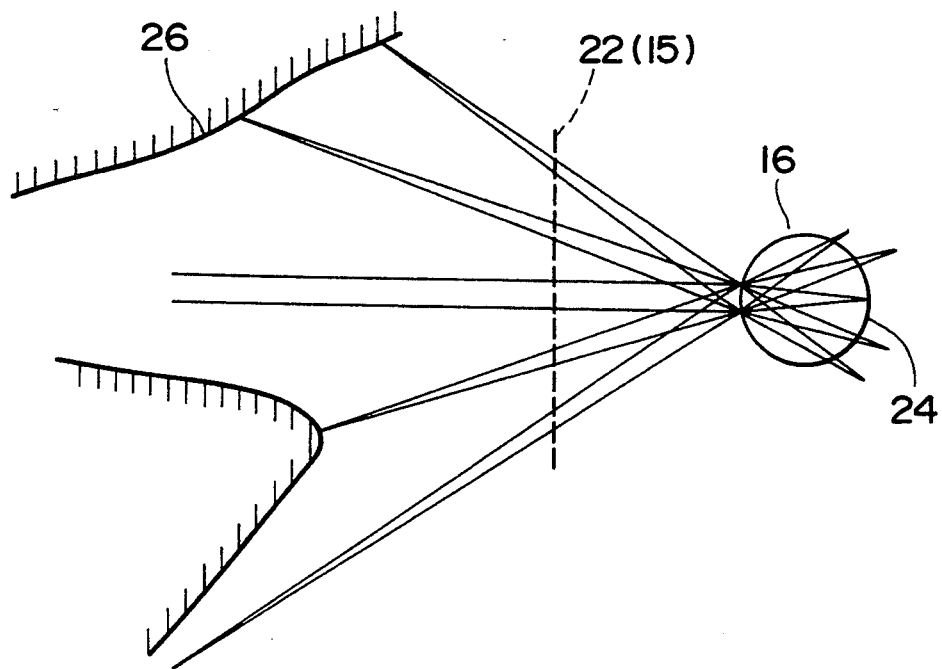

On the other hand, if the variable focus lens 89 is interposed as seen in FIG. 6, a laser beam outputted from the ideal lens 101 is not focused to form an image on the focal plane 103 but is focused to form a real image on such curved face 25 as seen in FIG. 11a. As a result, all of a laser beam introduced into the eye 96 by way of the ideal lens 102 does not form an image on the fundus 104, but only a portion of such laser beam which corresponds to a distance at which the eye 16 is focused will form an image on the fundus 104. Accordingly, a virtual image viewed from the eye 96 is an image at a position indicated by a curved face 26 as shown in FIG. 11b. In particular, it looks that light emitted from the curved face 26 is introduced into the eye 16.

As a result, a body at a near location and another body at a remote location are focused in different manners in accordance with a focusing function of an eye of a man as if a three-dimensional object is observed actually. Consequently, a three-dimensional feeling can be obtained.

While the direct viewing picture image display apparatus is constructed so that an image is observed with a single eye, it may otherwise be constructed so that an image is observed with two eyes. Such modified direct viewing picture image display apparatus is shown in FIG. 12.

Referring to FIG. 12, in the direct viewing picture image display apparatus shown, a laser beam outputted from an RGB laser 131 is divided into two beams including a laser beam for the right eye and another laser beam for the left eye by a beam splitter (half prism) 132. The laser beam for the right eye is divided into three beams of components of three colors of R, G and B by two dichroic mirrors 133aR and 133aG and a further mirror 133aB. The three laser beams are then arranged in beam shape by lenses 134aR, 134aG and 134aB and introduced to audio optical modulators 135aR, 13BaG and 135aB, respectively. To the audio optical modulators 135aR, 135aG and 135aB, video signals of R, G and B are supplied from video signal supplying circuits 149aR, 149aG and 149aB, respectively. Thus, the laser beams introduced to the audio optical modulators 135aR. 135aG and 135aB are optically modulated in response to such video signals. The laser beams outputted from the audio optical modulators 135aR, 135aG and 135aB are subsequently arranged in beam shape by lenses 136aR, 136aG and 136aB, respectively, and then combined into a single laser beam by a mirror 137aR and a pair of dichroic mirrors 137aG and 137aB. The single laser beam thus obtained is then introduced into a variable focus lens 138a. The variable focus lens 138a has a focal length which varies in response to a depth signal for the right eye received from a depth signal generating circuit 139a. The laser beam outputted from the variable focus lens 138a is introduced into and passes through a polarizing beam splitter 141.

Meanwhile, the laser beam for the left eye formed by division by the beam splitter 132 is divided into three laser beams of R, G and B by a pair of dichroic mirrors 133bR and 133bG and a further mirror 133bB. The laser beams are adjusted to have a predetermined sectional shape by lenses 134bR, 134bG and 134bB and then introduced into audio optical modulators 135bR, 135bG and 135bB, respectively. The audio optical modulators 135bR, 135bG and 135bB optically modulate the inputted laser beams in response to video signals of R, G and B supplied from video signal supplying circuits 149bR, 149bG and 149bB, respectively. The optically modulated laser beams are adjusted in sectional shape by lenses 136bR, 136bG and 136bB, respectively, and then combined into a single laser beam by a pair of dichroic mirrors 137bR and 137bG and a further mirror 137bB.

The single laser beam thus obtained is introduced into a variable focus lens 138b. The focal length of the variable focus lens 138b is varied in response to a depth signal for the left eye supplied from a depth signal supplying circuit 139b. The laser beam outputted from the variable focus lens 138b is then inputted to a ½ wavelength plate 140. While the laser beam when outputted from the RGB laser 131 is linearly polarized light, the polarization plane thereof is rotated by 90 degrees when it passes through the ½ wavelength plate 140. As a result, while the laser beam from the variable focus lens 138a passes through the polarizing beam splitter 141, the laser beam inputted from the variable focus lens 138b by way of the ½ wavelength plate 140 is reflected by the polarizing beam splitter 141 so that it is combined with the laser beam inputted from the variable focus lens 138a.

The thus combined laser beam from the polarizing beam splitter 141 is introduced into and scanned horizontally by a polygonal mirror 142 in response to a horizontal scanning signal received from a scanning signal supplying circuit 150. The laser beam reflected from the polygonal mirror 142 is introduced to and scanned vertically by a galvanometric mirror 143 in response to a vertical scanning signal received from a scanning signal supplying signal 150.

The laser beam scanned in the horizontal and vertical directions in this manner is introduced to a polarizing beam splitter 146 by way of a pair of relay lenses 144 and 145. As described hereinabove, the laser beam for the right eye and the laser beam for the left eye have polarization planes which are different in direction by 90 degrees from each other. Accordingly, the laser beam for the right eye passes through the polarizing beam splitter 146 and is introduced to a mirror 147a, by which it is reflected so that it is introduced into the right eye 148a. Meanwhile, the laser beam for the left eye is reflected by the polarizing beam splitter 146 and further reflected by a mirror 147a so that it is introduced into the left eye 148b.

With the direct viewing picture image display apparatus of FIG. 12, a stereoscopic picture image can be observed with two eyes in this manner.

Thus, with the direct viewing picture image display apparatus of FIG. 6, a stereoscopic picture image is observed only depending upon a focusing function of an eye of a human observer. However, with the direct viewing picture image of FIG. 12, a stereoscopic picture image can be observed depending upon a binocular parallax and binocular convergence in addition to a focusing function.

Further, in either of the direct viewing picture image display apparatus, a virtual image is observed not by way of a screen or the like, and accordingly, the two display apparatus will be classified into the spatial image display of the classification appearing on Table 2 mentioned hereinabove.

It is to be noted that any of the variable focus lenses 89, 138a and 138b mentioned hereinabove may be constituted from a liquid crystal lens or an EO lens. Or, one-dimensional variable focus cylindrical lenses may be employed in combination. Also, a combination with an ordinary lens may be used. A liquid crystal lens is disclosed, for example, in "Investigation of Liquid Crystal Lens", *Optics*, Vol. 18, No. 12, December, 1989, while an EO lens is disclosed in "Trial Manufacture of EO Lens with EO Material and Transparent Electrode", *O plus E*, March, 1990.

It is to be noted that it is possible to correct a depth signal to be provided to a variable focus lens with information regarding an aberration such as a spherical aberration of a lens of an optical system and a curved image plane, deformation of an image and focusing depending upon a difference in visual acuity between observers (visual acuity adjustment).

Meanwhile, a variable focus optical system may be constituted not from a variable focus lens but from a variable focus mirror.

Further, while raster scanning is employed in the direct viewing picture image display apparatus of the embodiments described hereinabove, it is also possible to apply the present invention to a vector system.

Having now fully described the invention, it will be apparent to one of ordinary skill in the art that many changes and modifications can be made thereto without departing from the spirit and scope of the invention as set forth herein.

What is claimed is:

1. A direct viewing picture image display apparatus comprising:
   a light source for emitting a laser beam;
   video signal supplying means for supplying a video signal;
   modulating means for optically modulating the laser beam emitted from said light source in response to the video signal supplied from said video signal supplying means;
   a variable focus optical means for providing depth information to the modulated laser beam received from said modulating means;
   scanning signal supplying means for supplying a scanning signal;
   scanning means responsive to said scanning signal for causing said modulated laser beam received from said variable focus optical means to effect a horizontal and vertical scan; and
   a projecting optical system for projecting and focusing the scanning laser beam received from said scanning means to form an image of the scanned, modulated laser beam directly on the retina of an eye of a user of the picture image display apparatus.

2. A direct viewing picture image display apparatus according to claim 1 wherein said scanning signal supplying means supplies a horizontal scanning signal and a vertical scanning signal, and said scanning means includes horizontal scanning means for causing horizontal scanning by the laser beam received from said modulating means in response to the horizontal scanning signal received from said scanning signal supplying means and vertical scanning means for causing vertical scanning by the horizontally scanning laser beam from said horizontal scanning means in response to the vertical scanning signal received from said scanning signal supplying means.

3. A direct viewing picture image display apparatus according to claim 1 wherein said scanning signal supplying means supplies a horizontal scanning signal and a vertical scanning signal, and said scanning means includes vertical scanning means for causing vertical scanning by the laser beam received from said modulating means in response to the vertical scanning signal received from said scanning signal supplying means and horizontal scanning means for causing horizontal scanning by the vertically scanning laser beam from said vertical scanning means in response to the horizontal scanning signal received from said scanning signal supplying means.

4. A direct viewing picture image display apparatus according to claim 1 wherein said modulating means includes an audio optical modulator for intensity modulating the laser beam emitted from said light source in response to the video signal supplied from said video signal supplying means.

5. A direct viewing picture image display apparatus according to claim 1 further comprising means for attenuating the laser beam to an intensity at which an eye to which the laser beam is introduced is not damaged by the laser beam.

6. A direct viewing picture image display apparatus according to claim 1 wherein said scanning means includes an audio optical deflector for effecting horizontal scanning by the laser beam from said modulating means in response to the scanning signal supplied from said scanning signal supplying means.

7. A direct viewing picture image display apparatus according to claim 1 wherein said scanning means includes a galvanometric mirror for effecting vertical scanning by the laser beam from said modulating means in response to the scanning signal supplied from said scanning signal supplying means.

8. A direct viewing picture image display apparatus according to claim 1 further comprising a ¼ wavelength polarizing plate for converting the laser beam from linearly polarized light into circularly polarized light.

9. A direct viewing picture image display apparatus according to claim 1 further comprising means for shaping the laser beam so as to have a predetermined circular transverse section.

10. A direct viewing picture image display apparatus according to claim 1 wherein said light source includes three lasers for emitting laser beams of different wavelengths and said modulating means optically modulates the laser beams emitted from said lasers individually in response to the video signal supplied from said video signal supplying means, and further comprising means for combining the modulated laser beams from said modulating means into a single laser beam and introducing the single laser beam to said scanning means.

11. A direct viewing picture image display apparatus according to claim 1 wherein said light source emits a laser beam including components of three different wavelengths, and further comprising means for separating the components of the laser beam from said light source into separate beams, said modulating means optically modulating the beams from said separating means individually in response to the video signal supplied from said video signal supplying means, and means for combining the modulated beams from said modulating means into a single beam and introducing the single beam to said scanning means.

12. A direct viewing picture image display apparatus comprising:
a light source for emitting a laser beam;
video signal supplying means for supplying a video signal;
modulating means for optically modulating the laser beam emitted from said light source in response to the video signal supplied from said video signal supplying means;
depth signal supplying means for supplying depth information;
a variable focus optical system for providing the depth information supplied from said depth signal supplying means to the modulated laser beam received from said modulating means;
scanning signal supplying means for supplying a scanning signal;
scanning means for effecting scanning by the laser beam received from said variable focus optical system in response to the scanning signal supplied from said scanning signal supplying means; and
a projecting optical system for projecting the scanning laser beam received from said scanning means to form an image of the laser beam on the retina of an eye of a user of the picture image display apparatus.

13. A direct viewing picture image display apparatus comprising:
a light source for emitting a laser beam;
video signal supplying means for supplying a video signal;
modulating means for optically modulating the laser beam emitted from said light source in response to the video signal supplied from said video signal supplying means;
depth signal supplying means for supplying depth information;
scanning signal supplying means for supplying a scanning signal;
scanning means for effecting scanning by the laser beam received from said modulating means in response to the scanning signal supplied from said signal scanning signal supplying means, said scanning means including a variable focus optical system for providing the depth information supplied from said depth signal supplying means to the laser beam received from said modulating means: and
a projecting optical system for projecting the scanning laser beam received from said scanning means to form an image of the laser beam on the retina of an eye of a user of the picture image display apparatus.

14. A direct viewing picture image display apparatus comprising:
a light source for emitting a laser beam;
video signal supplying means for supplying a video signal;
modulating means for optically modulating the laser beam emitted from said light source in response to the video signal supplied from said video signal supplying means;
depth signal supplying means for supplying depth information;
scanning signal supplying means for supplying a scanning signal;
scanning means for effecting scanning by the laser beam received from said modulating means in response to the scanning signal supplied from said scanning signal supplying means; and
a projecting optical system for projecting the scanning laser beam received from said scanning means to form an image of the laser beam on the retina of an eye of a user of the picture image display apparatus, said optical system including a variable focus optical system for providing the depth information supplied from said depth signal supplying means to the laser beam received from said scanning means.

15. A direct viewing picture image display apparatus according to any one of claims 12 to 14 wherein said variable focus optical system includes a variable focus lens having a focal length which is varied in response to the depth information from said depth signal supplying means.

16. A direct viewing picture image display apparatus comprising:
a light source for emitting a linearly polarized laser beam;

means for dividing the laser beam from said light source into first and second laser beams;

first and second video signal supplying means for supplying first and second video signals, respectively;

first and second modulating means for optically modulating the first and second laser beams from said dividing means in response to the first and second video signals supplied from said first and second video signal supplying means, respectively;

first and second depth signal supplying means for supplying first and second depth information;

first and second variable focus optical system for providing the first and second depth information supplied from said first and second depth signal supplying means to the modulated laser beams received from said first and second modulating means, respectively;

means for rotating the laser beam from said second variable focus optical system to produce a laser beam having a polarization plane perpendicular to that of the output laser beam of said first variable focus optical system;

means for combining the laser beams from said first variable focus optical system and said rotating means into a single laser beam;

scanning signal supplying means for supplying a scanning signal;

scanning means for effecting scanning by the laser beam received from said combining means in response to the scanning signal supplied from said scanning signal supplying means; and a projecting optical system for dividing the scanning laser beam received from said scanning means into two beams having perpendicular polarization planes relative to each other and projecting the two beams to form images of the beams on the retinae of a pair of eyes of a user of the picture image display apparatus.

17. A direct viewing picture image display apparatus according to claim 16 wherein said dividing means includes a ½ wavelength plate.

18. A direct viewing picture image display apparatus according to claim 16 wherein said projecting optical system includes a polarizing beam splitter which divides the laser beam from said scanning means into two beams having perpendicular polarization planes relative to each other.

19. A direct viewing picture image display apparatus according to claim 16 wherein said light source emits a laser beam including components of three different wavelengths, and each of said first and second modulating means includes means for separating the components of the laser beam from said diving means into separate beams, means for optically modulating the beams from said separating means, and means for combining the modulated beams into a single beam and introducing the single beam to the first or second variable focus optical system.

20. A direct viewing picture image display apparatus according to claim 1 wherein said scanning means includes a polygonal mirror for effecting horizontal scanning by the laser beam from said modulating means in response to the scanning signal supplied from said scanning signal supplying means.

* * * * *